United States Patent
Hamon

(10) Patent No.: US 9,298,679 B2
(45) Date of Patent: Mar. 29, 2016

(54) SYSTEM AND METHOD PROVIDING A BINARY REPRESENTATION OF A WEB PAGE

(71) Applicant: Google Inc., Mountain View, CA (US)

(72) Inventor: Dominic Hamon, San Francisco, CA (US)

(73) Assignee: Google Inc., Mountain View, CA (US)

( * ) Notice: Subject to any disclaimer, the term of this patent is extended or adjusted under 35 U.S.C. 154(b) by 387 days.

(21) Appl. No.: 13/790,285

(22) Filed: Mar. 8, 2013

(65) Prior Publication Data

US 2013/0246906 A1 Sep. 19, 2013

Related U.S. Application Data

(60) Provisional application No. 61/610,096, filed on Mar. 13, 2012.

(51) Int. Cl.
G06F 17/21 (2006.01)
G06F 17/22 (2006.01)
G06F 9/45 (2006.01)

(52) U.S. Cl.
CPC .......... *G06F 17/2247* (2013.01); *G06F 8/4441* (2013.01); *G06F 17/2252* (2013.01)

(58) Field of Classification Search
CPC .................................................. G06F 17/2247
USPC ......................................................... 715/234
See application file for complete search history.

(56) References Cited

U.S. PATENT DOCUMENTS

| | | | |
|---|---|---|---|
| 6,671,853 B1 * | 12/2003 | Burkett | G06F 17/30902 707/E17.12 |
| 7,007,105 B1 * | 2/2006 | Sullivan et al. | 709/247 |
| 7,627,814 B1 * | 12/2009 | Soldan et al. | 715/236 |
| 7,647,415 B1 * | 1/2010 | Sandoz et al. | 709/230 |

(Continued)

FOREIGN PATENT DOCUMENTS

WO 02060152 A2 8/2002

OTHER PUBLICATIONS

Bayardo, Roberto J., Daniel Gruhl, Vanja Josifovski, and Jussi Myllymaki. "An evaluation of binary xml encoding optimizations for fast stream based xml processing." In Proceedings of the 13th international conference on World Wide Web, pp. 345-354. ACM, 2004.*

(Continued)

*Primary Examiner* — Frank D Mills
(74) *Attorney, Agent, or Firm* — Lerner, David, Littenberg, Krumholz & Mentlik, LLP

(57) ABSTRACT

Systems and methods for providing a binary representation of a web page. A server may compile a source page, such as a hypertext markup language ("HTML") document, to create a compiled representation of the source page. Creation of a compiled representation may include generating a document object model ("DOM") for the content associated with the source page. The compiled page may be transmitted to a client as a random-access file or flat file, where the data is encoded in one or more data types other than a string representation. The client may receive the compiled page and load the compiled page directly as a DOM for the page without the need to parse HTML text strings. The server and client may reconcile the data format of the compiled page, such as by exchanging or verifying a compiler dictionary associated with the page.

15 Claims, 4 Drawing Sheets

(56) References Cited

U.S. PATENT DOCUMENTS

| | | | |
|---|---|---|---|
| 7,814,124 B1* | 10/2010 | de Jong et al. | 707/798 |
| 8,880,538 B1* | 11/2014 | Petersson | H03M 7/707 |
| | | | 707/756 |
| 2004/0133855 A1* | 7/2004 | Blair et al. | 715/517 |
| 2005/0022116 A1* | 1/2005 | Bowman | G06F 17/30896 |
| | | | 715/234 |
| 2006/0112167 A1 | 5/2006 | Steele et al. | |
| 2007/0044012 A1* | 2/2007 | Suver et al. | 715/513 |
| 2007/0113171 A1* | 5/2007 | Behrens | G06F 15/7842 |
| | | | 715/239 |
| 2007/0179985 A1* | 8/2007 | Knowles et al. | 707/200 |
| 2009/0063530 A1* | 3/2009 | Lee et al. | 707/101 |
| 2009/0164510 A1 | 6/2009 | Bostian | |
| 2009/0174583 A1* | 7/2009 | Diaz-Gutierrez | H03M 7/40 |
| | | | 341/65 |
| 2009/0222787 A1 | 9/2009 | Aldahleh et al. | |
| 2010/0050089 A1 | 2/2010 | Kim et al. | |
| 2010/0281182 A1 | 11/2010 | Eller | |
| 2011/0276659 A1 | 11/2011 | Choi et al. | |
| 2012/0151321 A1* | 6/2012 | Naismith et al. | 715/234 |
| 2012/0260157 A1* | 10/2012 | Zhu et al. | 715/234 |
| 2012/0330984 A1* | 12/2012 | Fablet | G06F 17/2247 |
| | | | 707/755 |
| 2013/0212559 A1* | 8/2013 | Lehtimaki et al. | 717/109 |
| 2013/0268843 A1* | 10/2013 | Xu et al. | 715/234 |

OTHER PUBLICATIONS

WIPO, International Perliminary Report on Patentability, International Application No. PCT/US2013/029879, Issued Sep. 16, 2014.*
International Search Report and Written Opinion for Application No. PCT/US2013/029879 dated Mar. 8, 2013.
Extended European Search Report for EP Patent Application No. 13761758.5, dated Nov. 25, 2015.

* cited by examiner

SYSTEM AND METHOD PROVIDING A BINARY REPRESENTATION OF A WEB PAGE

CROSS-REFERENCE TO RELATED APPLICATIONS

The present application claims the benefit of the filing date of U.S. Provisional Patent Application No. 61/610,096 filed Mar. 13, 2012, the disclosure of which is hereby incorporated herein by reference.

BACKGROUND

The advent of the World Wide Web has placed more information at the fingertips of today's users than ever before. Various websites cater to nearly every need and interest, providing access to reference information, business and financial documents, social networking, and more. Widespread broadband Internet access provides faster access to these sites than ever before.

However, as fast as current high-speed Internet services are, the act of browsing the web is not instantaneous. When a user selects a link on a page or enters a uniform resource locator (URL) in a text field, there is a delay while data is requested from the host, sent to the client, and rendered in the browser. Web pages are typically provided as hypertext markup language (HTML) documents. These documents are constructed of text strings that define the structure and content of the associated web page. In order to utilize the text strings to display the web page, the text strings are parsed and processed by software executing on the client, such as a web browser. The parsing and processing of these text strings requires time and system resources of the client. On electronic devices that have fewer system resources to devote to the display of web content, such as mobile devices, these parsing and processing steps may cause a noticeable delay in the display of the associated web content. Sending the HTML content as text strings may also be inefficient, as string data types may require more data and a larger memory footprint than alternatives.

BRIEF SUMMARY

Systems and methods for providing a binary representation of a web page are described. A server may compile a source page, such as a hypertext markup language ("HTML") document, to create a compiled representation of the source page. Creation of a compiled representation may include generating a document object model ("DOM") for the content associated with the source page. The compiled page may be transmitted to a client as a random-access file or flat file, where the data is encoded in one or more data types other than a string representation. The client may receive the compiled page and load the compiled page directly as a DOM for the page without the need to parse HTML text strings. The server and client may reconcile the data format of the compiled page, such as by exchanging or verifying a compiler dictionary associated with the page.

Aspects of the disclosure provide a computer-implemented method for providing a binary representation of a web page. The method may include parsing a web page source document, using a processor, to identify one or more page elements, the source document comprising text that defines a web page, where the source document is written in hypertext markup language ("HTML"), generating, with the processor, a binary representation corresponding to a document object model structure of a web page using the identified one or more page elements, the first binary representation including a conversion of the one or more page elements to a format other than plain text, and providing the binary representation such that, in response to a request from a client device, the binary representation is provided to the client device to render the web page without parsing the web page source document. The binary representation may be generated using a binary representation dictionary, the binary representation dictionary defining at least one binary instruction corresponding to each of the one or more page elements. The binary representation includes a datum identifying a version of the binary representation dictionary. The binary representation may include a tree structure, and each of the one or more page elements may be a node in the tree structure. The first binary representation may further include content associated with the web page. The binary representation may further include cascading style sheet information associated with the web page. The binary representation may be associated with a version identifier. The method may include determining if the web page source document has changed since the binary representation was generated using the version identifier, and generating a new binary representation using the web page source document if the web page source document has changed since the binary representation was generated. The version identifier may be at least one of a time stamp or a hash value.

Aspects of the disclosure provide a computer-implemented method for processing a web page received in a binary representation. The method may include receiving a web page in a binary representation, the binary representation defining a document object model of the web page, the document object model defining one or more hypertext markup language ("HTML") page elements as including at least a pair of an integer value and one or more attributes associated with the integer value, and rendering the web page, using a processor, by processing the binary representation, the structure of the web page defined by the document object model. The method may further include reconciling a first binary representation dictionary version used in rendering the web page with a second binary representation dictionary version used in compiling the web page. The method may further include rendering the web page only when the first binary representation dictionary version is greater than or equal to the second binary representation dictionary version. The method may include requesting an updated binary representation dictionary when the first binary representation dictionary version is not greater than or equal to the second binary representation dictionary version. The rendering may be performed by a browser layout engine executing on the processor. The method may further include requesting a HTML source document for the web page in response to a user's request to view the HTML source document. The binary representation may include a tree structure defining the document object model and the one or more page elements, the binary representation is received incrementally, and the method may further include requesting data corresponding to the one or more page elements as each page element is rendered.

Aspects of the disclosure provide a processing system for providing a binary representation of a web page. The processing system may include a memory for storing a web page source document and a binary representation of the web page source document, at least one processor coupled to the memory. The processor may be configured to parse the web page source document to identify one or more page elements, the web page source document comprising text that defines a web page, where the source document is written in hypertext markup language ("HTML"), generate a binary representation corresponding to a document object model of a web page using the identified one or more page elements, the binary representation including a conversion of the one or more page elements to a format other than plain text, and provide the binary representation such that, in response to a request from a client device, the binary representation may be provided to the client device to render the web page without parsing the web page source document. The binary representation may be generated using a binary representation dictionary, the binary representation dictionary may define at least one binary instruction corresponding to each of the one or more page elements. The binary representation may include a datum identifying a version of the binary representation dictionary. The binary representation may include a tree structure, and each of the one or more page elements is a node in the tree structure. The binary representation may include content of the web page. The binary representation may include cascading style sheet information associated with the web page. The binary representation may be associated with a version identifier, and the method may include determining if the web page source document has changed since the first binary representation was generated using the version identifier, and generating a new binary representation using the web page source document if the web page source document has changed since the first binary representation was generated. The version identifier may be at least one of a time stamp or a hash value.

Aspects of the disclosure provide a non-transitory computer readable storage medium containing instructions that, when executed by a processor, cause the processor to perform a method. The method may include receiving a web page in a binary representation, the binary representation defining a document object model of the web page, the document object model defining one or more hypertext markup language ("HTML") page elements as including at least a pair of an integer value and one or more attributes associated with the integer value, and rendering the web page, using a processor, by processing the binary representation, the structure of the web page defined by the document object model. The instructions may further include reconciling a first binary representation dictionary version used in rendering the web page with a second binary representation dictionary version used in compiling the web page. The instructions may further include rendering the web page only when the first binary representation dictionary version is greater than or equal to the second binary representation dictionary version. The instructions may include requesting an updated binary representation dictionary when the first binary representation dictionary version is not greater than or equal to the second binary representation dictionary version. The rendering may be performed by a browser layout engine executing on the processor. The instructions may include requesting a HTML source document for the web page in response to a user's request to view the HTML source document. The binary representation may include a tree structure defining the document object model and the one or more page elements, the binary representation is received incrementally, and the instructions may further include requesting data corresponding to the one or more page elements as each page element is rendered.

DETAILED DESCRIPTION

The aspects, features and advantages of the present disclosure will be appreciated when considered with reference to the following description of preferred embodiments and accompanying figures. The following description does not limit the disclosure; rather, the scope is defined by the appended claims and equivalents. While certain processes in accordance with example embodiments are shown in the figures as occurring in a linear fashion, this is not a requirement unless expressly stated herein. Different processes may be performed in a different order or concurrently.

The disclosure describes systems and methods for providing a binary representation of a web page. Aspects of the disclosure provide a straightforward process for speeding up the load time of web content and decreasing the amount of data that is transmitted from a server to a client before the client may render the web content. Elements of the system relate to compiling a source web page into a compiled page, such that the compiled page may be loaded directly by the client without the need to parse hypertext markup language ("HTML") text data.

A server may host web content, and a client device may request the web content from the server. The server may provide a compiled version of the web content in response to the client request. The compiled version may be a binary representation of the web page, such as a generated DOM that represents the structure and/or content of the web page in a binary format, rather than the text string format in which HTML pages are typically provided. Providing the web content in this format allows for faster processing by the client device, because the client device may not parse text data transmitted in a HTML document to render the web content.

Figure 1:
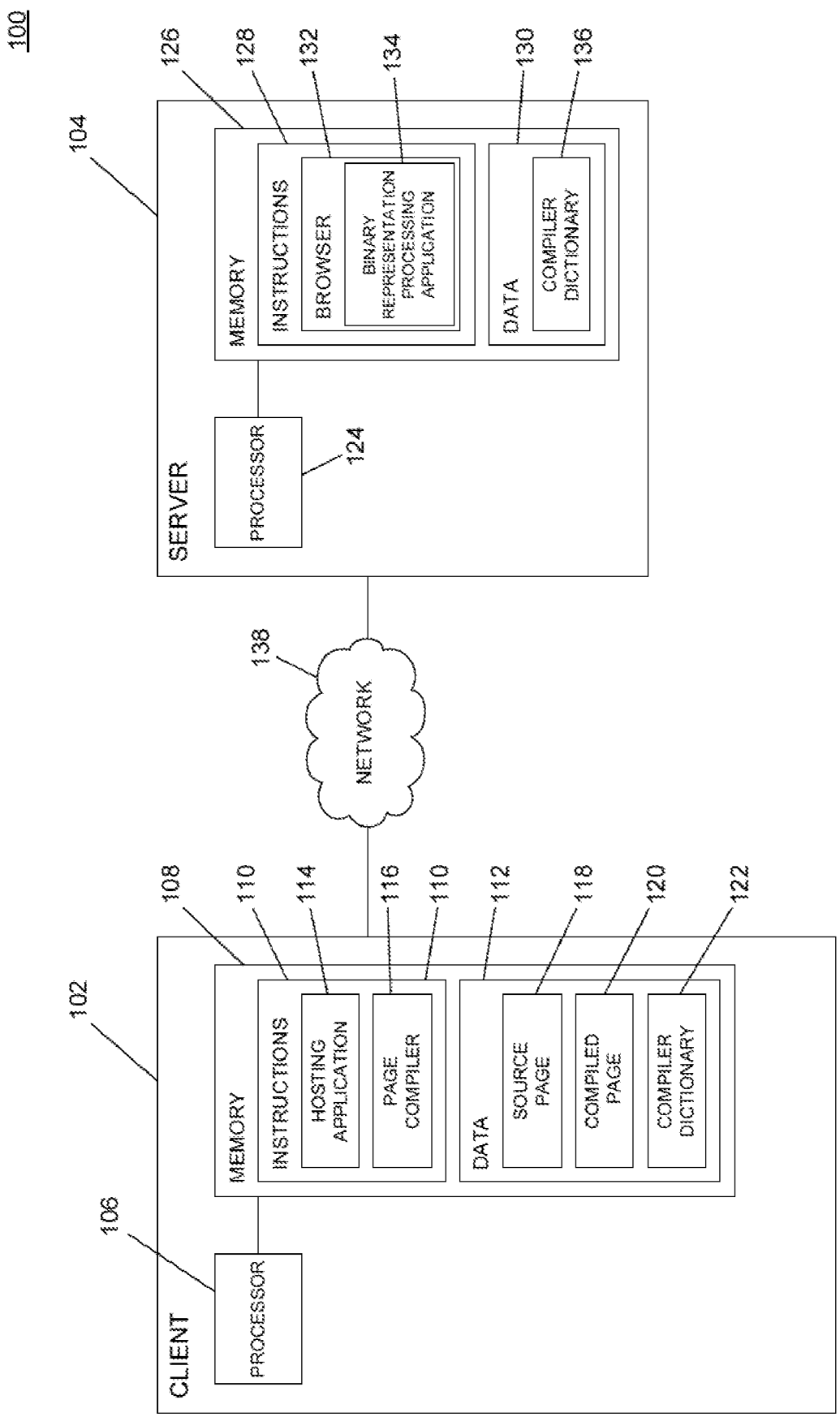
FIG. 1 is a system diagram depicting an example of a system for providing a binary representation of a web page in accordance with aspects of the disclosure.

FIG. 1 is a system diagram depicting an example of a system 100 for providing a binary representation of a web page in accordance with aspects of the disclosure. As shown in FIG. 1, an example of such a system includes a server 102 coupled to a client 104 via a network 138. The server 102 may be operable to host web content, compile the web content into a binary representation, and provide the web content and/or the binary representation to the client device 104. The server 102 may be computing device such as a laptop computer, a desktop computer, a netbook, a rack-mounted server, a smartphone, a cellular phone, a tablet computer, or any other device containing programmable hardware or software for executing instructions. Although aspects of the disclosure generally relate to a portable device, the server 102 may be implemented as multiple devices with both portable and non-portable components (e.g., software executing on a rack-mounted server with a mobile interface for gathering location information). The server 102 may include a processor 106, a memory 108 and other components typically present in general purpose computers. The processor 106 may be any processor capable of execution of computer code. Alternatively, the processor 106 may be a dedicated controller such as an application-specific integrated circuit ("ASIC") or other processing device.

The server 102 may have all of the components normally used in connection with a wireless mobile device such as a central processing unit ("CPU"), memory (e.g., RAM and ROM) storing data and instructions, an electronic display (e.g., a liquid crystal display ("LCD") screen or touch-screen), user input (e.g., a keyboard, touch-screen or microphone), camera, a speaker, a network interface component, and all of the components used for connecting these elements to one another. Some or all of these components may all be internally stored within the same housing, e.g. a housing defined by a plastic shell and LCD screen.

The memory 108 may store information that is accessible by the processor 106, including instructions 110 that may be executed by the processor 106, and data 112. The memory 108 may be of any type of memory operative to store information accessible by the processor 106, including a non-transitory computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions and data are stored on different types of media.

The instructions 110 may be any set of instructions to be executed directly (such as machine code) or indirectly (such as scripts) by the processor 106. For example, the instructions 110 may be stored as computer code on the computer-readable medium. In that regard, the terms "instructions" and "programs" may be used interchangeably herein. The instructions 110 may be stored in object code format for direct processing by the processor 106, or in any other computer language including scripts or collections of independent source code modules that are interpreted on demand or compiled in advance.

The instructions 110 may comprise a hosting application 114 for providing web content, such as a source page 118 or a compiled page 120, to the client device 102. The hosting application 114 may be any application capable of providing such content, such as APACHE, NGINX, INTERNET INFORMATION SERVICES, or the like. For example, the hosting application 114 may be operable to receive network content requests, such as a Hypertext Transfer Protocol ("HTTP") GET request, and provide content in response to the request.

The instructions 110 may further comprise a page compiler 116. The page compiler 116 may convert HTML text of the source page 118 to a set of compiled data stored in the compiled page 120. For example, the page compiler 116 may parse the text of the source page 118 to determine the structure and the content of the page. The page compiler 116 may convert elements of the structure and content into data formats other than the text data contained within the source page 118. The format of the compiled page 120 may be specified by a compiler dictionary 122. For example, the compiler dictionary 122 may specify that particular elements of the page structure (e.g., particular page attributes, tags, or element identifiers) are stored as particular data types (e.g., integers, vectors, maps, strings). The page compiler 116 may further associate the compiled page 120 with a particular time or date stamp to indicate when the compiled page 120 was generated. The page compiler 116 may create multiple binary representations of each page. For example, the page compiler 116 may generate a first, uncompressed binary representation of a page that minimizes the amount of processing that must be done to render the page, and a second, compressed binary representation of the page that compresses the data to further reduce the file size, but requires more processing by a browser to render.

The page compiler 116 may also associate the compiled page with a version identifier, which may identify the version of the compiler dictionary 122 utilized to generate the compiled page. The page compiler 116 may be implemented as a separate application, or it may be integrated into the hosting application 114. For example, the page compiler 116 may be integrated into the hosting application 114 to dynamically verify web content as it is loaded, accessed, and hosted by the hosting application 114, and recreate the compiled page 120 in the event an alternate compiler dictionary 122 is provided. When providing the web content, the page compiler 116 may verify that the content to be provided may be converted to a compiled page 120 before hosting. Where the compiled page 120 is dynamically generated in response to a request form the client, the compiled page 120 may be provided piece-meal to the client, with structure and content interleaved and provided as it is compiled.

The data 112 may be retrieved, stored or modified by the processor 106 in accordance with the instructions 110. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

Portions of the data 112 may comprise the source page 118, the compiled page 120, and the compiler dictionary 122. The source page 118 may include a HTML document defining a set of web content. The HTML document includes a set of text data from which a web page may be constructed. While data stored in a text format may be easy for a user to read and edit, this text must be parsed by a program before it can be used to create a web page.

The compiled page 120 may be a binary representation of the source page 118. The compiled page 120 may be stored in a platform independent data format. For example, the compiled page 120 may be stored in two different versions, one version for little-Endian clients and one version for big-Endian clients. Alternately, the compiled page 120 may be stored in a single format. For example, the compiled page 120 may be stored in a little-Endian format to ease adoption on certain hardware configurations, with an understanding that hardware configurations with big-Endian formats will convert the data upon receipt.

The compiled page 120 may be in a particular format as defined by the compiler dictionary 122. For example, the compiled page 120 may include an integer value for a version identifier, a vector for a list of elements of the page, a tree structure for elements of the DOM, map structures for each tag and the associated tag attributes, and the like. Certain HTML features and tags may be identified using integers, such as by using a particular integer value for bold or italic text, or a particular integer value to indicate that a tag is a hyperlink.

For example, the compiled page may have the following structure:

```
Version: integer
DOM: tree<pair<Type, index>>
Type: Element type | Contents type
ElementList: vector<Element>
Element: pair<Tag, AttributeList>
Tag: enum [a, body, b, em, html, ...]
AttributeList: map<AttributeKey, AttributeValue>
AttributeKey: string
AttributeValue: pair<string, QuoteType>
QuoteType: enum [None, Single, Double]
ContentList: vector<Content>
Content: string
```

The "version" term may describe a set of TagIds that are supported (e.g., clients may require a version of the dictionary >=this version). The "DOM" term may define a generic tree that can be stored as a left child right sibling binary tree and then written out as an array in breadth-first order to minimize the memory footprint of the tree. The client may choose to process the tree into a more general structure for depth-first searches. For ease of implementation, the tree may also be written out in preorder with NULL markers as a first approximation. The client may choose to process the tree into a more general structure for depth-first searches. The "Type" field may designate which table to use to look up the data for the entry in the tree. New HTML features may be added to the end of the enum and deprecated tags may remain in the enum to ensure consistency across versions. Clients may choose to implement a given TagId as a no-op (e.g., no operation will be performed). It may be possible to consolidate some HTML tags into single TagIds with dummy attributes. For example, b, em, i, and strong could all be a style id with an attribute describing the style. The "QuoteType" term may identify the type of quotes used in the document, in order to avoid malformed HTML. The "Content" term may identify string content associated with the element. For international implementations, it may be important that this string data respects the original encoding of the HTML page. As such, this element may be encoded using UTF-8. As described above, multiple binary representations may be generated corresponding to different data formats. Different formats may compress the data of the original HTML file to further reduce file size. The client may indicate which format should be provided when requesting the page. For example, where the client is bandwidth constrained (e.g., a mobile device on a 3G network), the client may request the compressed representation of the page, and where the client is not bandwidth constrained (e.g., the same mobile device on a Wi-Fi network), the client may request the uncompressed representation.

The binary representation may include conversion of different page elements into a binary format. For example, HTML documents include one or more tags, and contents associated with those tags. A binary representation may include a particular instruction code (e.g., 8 bits of data) for each type of tag. Although 8 bit instruction codes are described (allowing 255 distinct tag instruction types), different size instruction codes may be utilized to define fewer or more tags. Tags may also be associated with style information (e.g., <em>, <b>, or <a>). These styles may be each associated with an instruction value. The styles may be represented by a 16 bit index into a style table, such as a table maintained in the compiler dictionary 122, or a style table may be provided as part of the compiled page 120, such that each compiled page may provide a unique set of styles. Each style may be associated with one or more colors and font rendering and positional information. As an example of the benefits of transmitting the web content as a binary representation, consider the following HTML data:

<title>pagetitle</title>

To transmit this data from the server 102 to the client 104 as a source page 118, the server 102 would transmit bytes of data, one byte for each character in the HTML document. Alternately, as a compiled representation, the page information could be transmitted as 8 bytes, as follows:

09 09 70 61 67 65 74 69 74 6C 65

"09" may be an instruction indicating that the tag is a "title" tag, "09" indicates the number of characters in the title, and "70 61 67 65 74 69 74 6C 65" represent the ASCII values of the text "pagetitle". Definitions of the values associated with each tag and the attendant syntax may be defined in the compiler dictionary 122. The compiler dictionary 122 may be sent to the client along with the compiled page 120, or the server 102 and client 104 may perform a handshake process verifying that the client 104 is using an appropriate version of the compiler dictionary 122 to process the compiled page. The client 104 may utilize a version number embedded within the compiled page 120 to verify that the compiled page 120 can be properly processed.

The compiled page 120 may also be provided in more than one file. For example, a first file may be provided with the DOM structure of the page, and a second file may be provided with the content associated with the DOM elements (e.g., text associated with particular tags). These files may be cached and maintained separately by the server 102, so that a change to the content of a page does not necessarily result in the recompiling of the structure of the page, assuming the structure has not changed.

The compiled page 120 may also include style information of the source page 118. For example, the source page 118 may include a set of style attributes such as size, shape, and color, stored as a Cascading Style Sheet ("CSS") file. This CSS file may also include text data that is to be parsed and processed by the browser, and thus may benefit from compiling into a binary format. As such, a third "style" file may be provided along with the structure and content of the page. Although the structure, content, and style are described as being provided separately and distinctly, these elements can also be broken down into component parts and provided in an interleaved format to the client 104. For example, some structure elements of the page may be provided along with content elements associated with those structure elements before sending additional structure elements or style data.

Although FIG. 1 functionally illustrates the processor 106 and memory 108 as being within the same block, the processor 108 and memory 110 may actually comprise multiple processors and memories that may or may not be stored within the same physical housing. Accordingly, references to a processor, computer or memory will be understood to include references to a collection of processors, computers or memories that may or may not operate in parallel.

The client 104 may be operable to request web content from the server 102, and display the web content, such as via a browser 132. The client 104 may be configured similarly to the server 102, with a processor 124 and memory 126. As described with respect to the server 102, the memory 126 may comprise a set of instructions 128 and a set of data 130. The processor 124 executes the instructions 128 to control operation of the client 104. The instructions 128 may include a browser 132.

The browser 132 may function to request, receive, and display web content, such as the compiled page 120. When receiving a standard HTML document, such as the source page 118, the browser may parse the text of the document and process the parsed text to generate a DOM for the page. The browser 132 may interact with this generated DOM to display the page to the user and allow interaction with the page. When receiving a binary representation of a page, such as the compiled page 120, the browser 132 may load the binary representation directly into a DOM, without the need to parse text of the page. The browser 132 may include a binary representation processing application 134 to interpret the binary representation and load the contents of the binary representation into a DOM. The binary representation processing application 134 may be integrated within the browser 132 directly, such as at the lowest resource-loading level of the browser 132 (e.g., in WEBKIT, a layout engine included in some popular browsers) or as a browser plug-in. In instances where the binary representation processing application 134 is integrated directly with the browser, the binary representation processing application 134 may replace a previous implementation of the DOM within the browser 132 and allow manipulations and accesses to the DOM via the binary representation processing application 134.

In some instances the client 104 may also request the source page 118 in addition to the compiled page 120. For example, a user may wish to view the page source associated with the displayed content. The browser 132 may be operable to request the source page 118 from the server 102 in response to such a request by the user.

The server 102 may be at a first node of a network 138 and the client 104 may be at a second node of the network 138. The server 102 and the client 104 may be operative to directly and indirectly communicate with other nodes of the network. For example, the client 104 may comprise a mobile device that is operative to communicate with the server 102 via the network 138 such that the server 102 uses the network 138 to transmit and display web content to a user via the client 104. The server 102 may also comprise a plurality of computers that exchange information with different nodes of a network for the purpose of receiving, processing and transmitting data to the client devices; in this instance, the client 104 may be at a different node of the network than any of the computers comprising the server 102.

The network 138, and the intervening nodes between the server 102 and the client 104, may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, HTTP and simple mail transfer protocol ("SMTP"), and various combinations of the foregoing. Although only a single client device is depicted in FIG. 1, it should be appreciated that a typical system may include a large number of connected computers.

Although some functions are indicated as taking place on the server 102 and other functions are indicated as taking place on the client 104, various aspects may be implemented by a single computer having a single processor. In accordance with one aspect of the system and method, operations performed on the server 102 may be implemented on the client 104, and vice-versa.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system.

Figure 2:
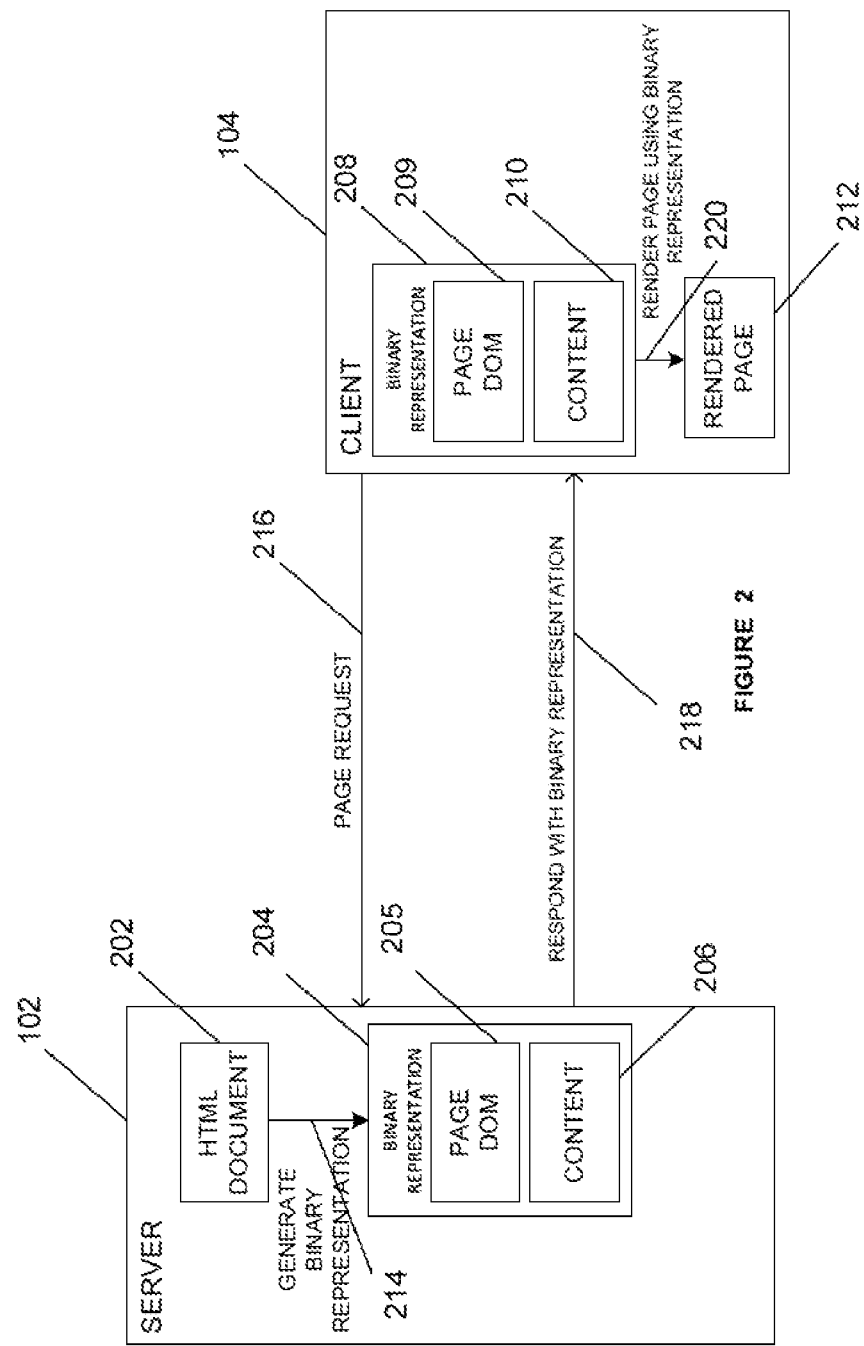
FIG. 2 is an illustration of an example of a data flow between a client and server in accordance with aspects of the disclosure.

FIG. 2 is an illustration of an example of a data flow 200 between a client 104 and server 102 in accordance with aspects of the disclosure. The data flow 200 depicts the process by which a compiled web page is transmitted from the server 102 to the client 104. The server 102 is operable to host a set of web content, and compile that web content into a binary representation. The binary representation is transmitted to the client 104 for rendering, such that the client does not need to parse data stored in an inefficient format, such as plain text. The web page may thus be displayed more quickly to the user by processing the web content in a native format without parsing or converting the text of the document.

The server 102 hosts a web page represented by a HTML document 202. The HTML document 202 contains text information that describes the structure and content of the web page. The structure and content of the page are stored as a series of tags represented by plain text.

At action 214, the HTML document 202 is compiled into a binary representation of the page DOM 204 and a set of content 206. The HTML document 202 may be compiled by parsing the text to identify the tags, styles, content, and the like contained within the document. The parsed text may be converted into a binary representation 204, where different page elements correspond to particular binary values or instructions. The binary representation 204 may comprise a DOM 205 and a set of content 206. The relationship between page elements and binary values may be enumerated in a compiler dictionary as described above (see FIG. 1).

The client 104 may send a request to the server 102 for a web page at action 216. The request may be a HTTP GET request, or any other method of requesting a HTML document. The client 104 may indicate in the request that the client 104 is capable of supporting binary representations of web content. This flag in the request may induce the server 102 to respond with the binary representation 204 instead of a standard HTML document. The server 102 may respond to the HTTP GET request by providing the binary representation 204 to the client 104, where it is stored as the binary representation 208, including a DOM 209 and a set of content 210. The binary format of the page allows the client 104 to process the page DOM 209 without the need to parse text to determine the structure and content of the page. Thus, the client 104 may load the binary representation 208, including the page DOM 209, directly into memory as the structure of the page without an intervening text parsing process.

The content 210 associated with the DOM 209 may be transmitted as part of the same binary representation, or in a separate request/response action between the client 104 and the server 102. For example, the page DOM 208 may contain a set of tags and formatting information that defines the structure of the page, but the actual content of those tags may not have been received by the client 104. As such, the client 104 may request the page content 206 from the server 102. The server 102 may evaluate where the page should be recompiled into a new binary representation 204 upon receiving the request from the client 102. In circumstances where the page is recompiled, the server 102 may transmit individual page elements as they are recompiled, rather than waiting for the entire page to be converted to a binary representation. The response header sent to the client in response to the initial request may indicate that compilation was possible (i.e., no validation errors occurred prior to beginning recompilation). In response to receiving the appropriate response header, the client may render as normal, and scripts in the page may manipulate the DOM as usual without the need for the client to transform the data received into a separate internal representation, as would be performed with a traditional HTML document.

At action 220, the client 104 may utilize the binary representation 208 to render the web page in a browser to provide a rendered web page 212.

Figure 3:
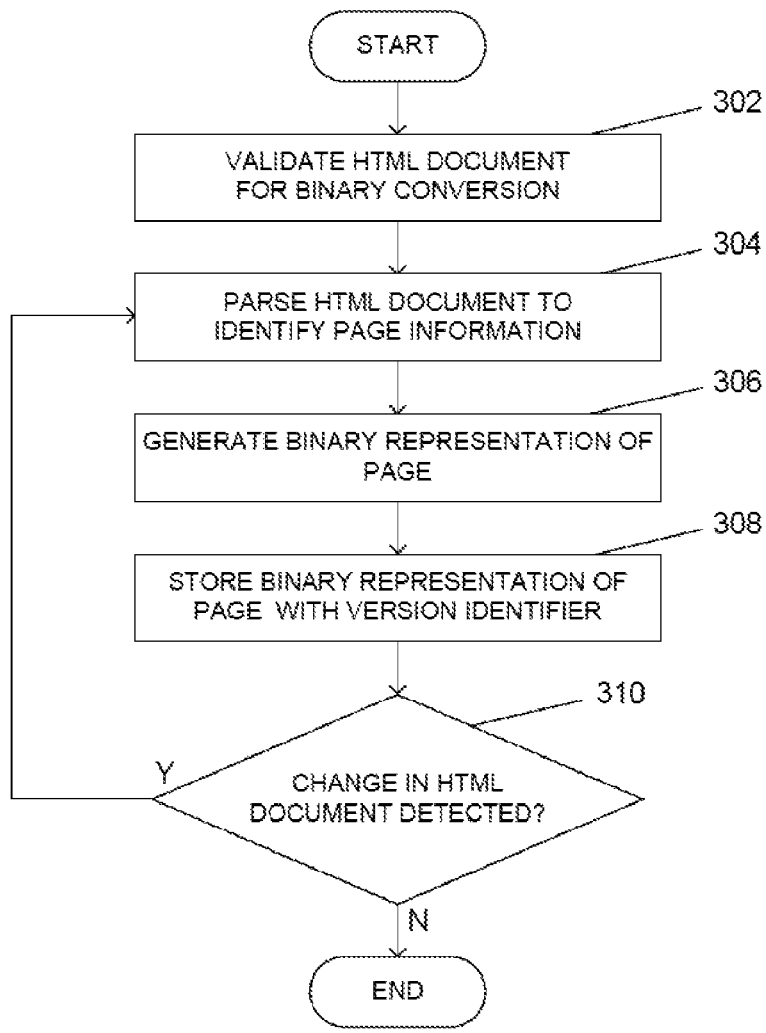
FIG. 3 is a flow diagram of an example of a method for creating a binary representation of a web page in accordance with aspects of the disclosure.

FIG. 3 is a flow diagram of an example of a method 300 for creating a binary representation of a web page in accordance with aspects of the disclosure. The method 300 is operable to convert a text HTML document into a binary representation such that a web browser may interpret the binary representation to render the web page associated with the HTML document. The method 300 may be performed by a server, such as the server 102 described above (see FIG. 102) or any computing device operable to execute instructions with a processor.

At action 302, a HTML document is validated to ensure that the document may be processed into a binary representation. For example, a compiler application may identify the tags included in the HTML document to ensure that each tag is associated with a particular binary value in a compiler dictionary. In some cases, parts of the HTML document may be converted to a binary representation and parts may not, if certain tags or content are not contained within the dictionary. For example, if the HTML document is not well formed according to W3C standards, it may not be possible to create a binary representation of the document. The validation check may be performed when receiving the HTML document to ensure that when the document is requested, it may be properly converted to a binary representation.

At action 304, the HTML document is parsed to identify information that describes the page associated with the HTML document. For example, each HTML tag, style, and the associated content may be identified within the page for compiling into the binary representation. The parsing process may utilize the compiler dictionary to identify particular elements of the page. The identified page elements may be utilized to create a page structure in the binary representation.

At action 306, a binary representation of the page associated with the HTML document is created. The page elements identified at action 304 may each be associated with a particular instruction code or binary value. These instruction codes may be entered in the binary representation in such a way that they may be read and processed by a client to recreate the web page without needing to parse the original HTML text from the HTML document. The binary representation may also be compressed during this process, though compression may not be optimal in all circumstances due to the need to decompress the representation when the binary representation is read. Compression may thus be utilized to reduce the amount of data transmitted while requiring additional processing on the client side, or the binary representation may be transmitted uncompressed to minimize the amount of processing by the client. As described above (see FIG. 1), multiple binary representations may be generated for a given HTML document. For example, a first binary representation may minimize rendering time (e.g., uncompressed data), while another binary representation may compress the data to further reduce the file size.

The binary representation may be generated in response to a request by a client for the web page associated with the HTML content, or it may be generated in advance of the request. The server 102 may periodically generate binary representations of hosted HTML documents to ensure that the binary representations are immediately available for sending to the client upon a request from the client, or the server 102 may generate the binary representation on-demand.

At action 308, the binary representation is stored for transmission to the client. The binary representation may also be stored with a version identifier. The version identifier may identify certain aspects of the binary representation. For example, the version identifier may be used to identify the source HTML document used to create the binary representation, the date or time the binary representation was created, and/or the version of the compiler dictionary utilized to create the binary representation. The version identifier may be used to determine whether the binary representation should be recreated (e.g., if the version identifier indicates the binary representation was created more than 1 day, 1 week, or 1 month ago, it should be recreated).

At action 310, a change in the HTML document may be detected. When the HTML document changes, it may be necessary to recompile the document to create a new binary representation or alter the stored binary representation. For example, the method 300 may monitor for a change in a timestamp, a checksum, or a file hash in the source HTML document (e.g., a MD5 checksum), and initiate a recompilation of the HTML document when the change occurs. If a change is detected, the method 300 returns to action 304 to create a new binary representation. Otherwise, the method 300 ends.

Figure 4:
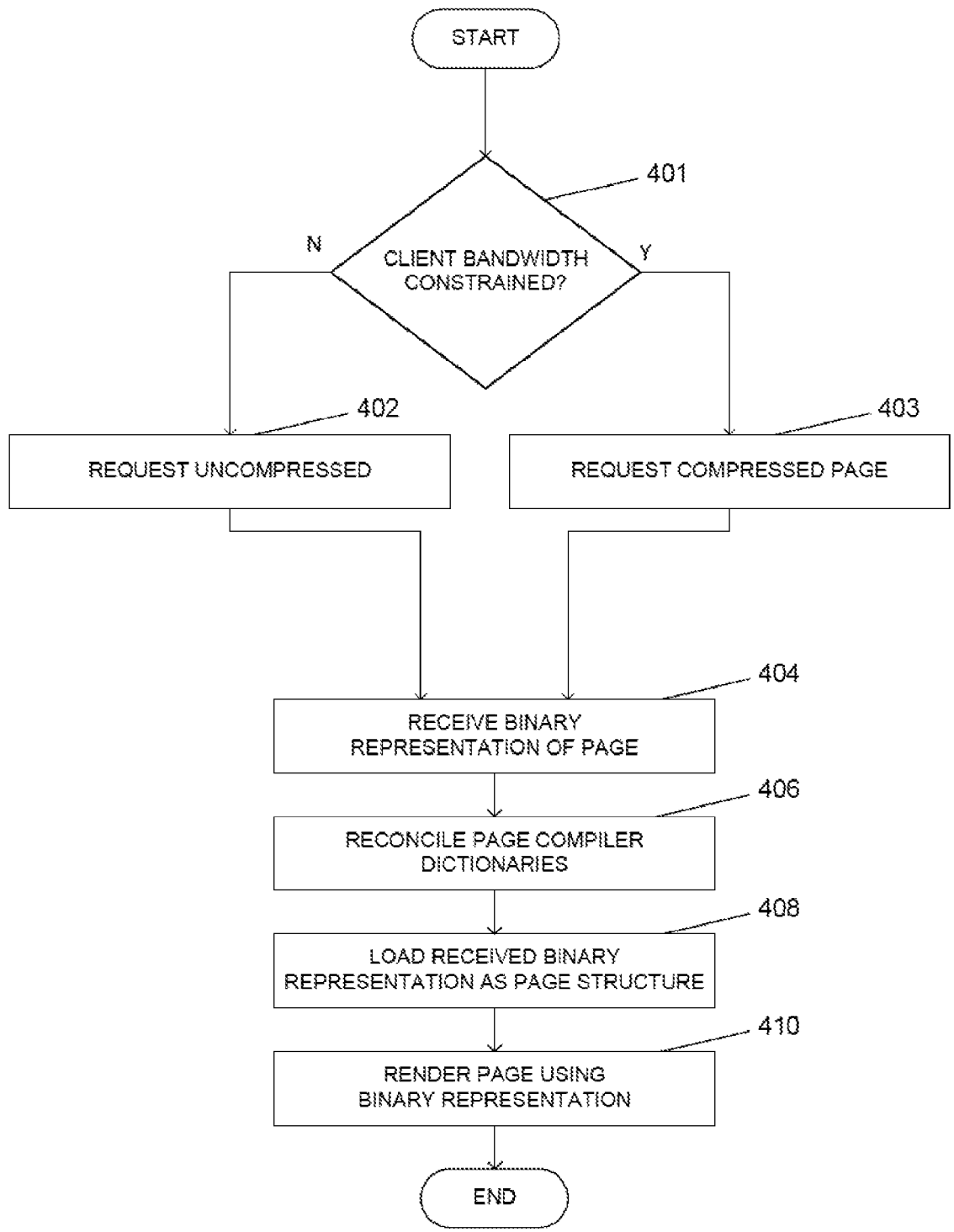
FIG. 4 is a flow diagram of an example of a method for accessing a web page using a binary representation of the web page in accordance with aspects of the disclosure.

FIG. 4 is a flow diagram of an example of a method 400 for accessing a web page using a binary representation of the web page in accordance with aspects of the disclosure. In order to process a web page encoded in a binary representation, the client receiving the page may need to ascertain that the page provided in response to the client's request is not encoded in a standard text format. For example, the client may be programmed or configured to identify that the server has provided a web page encoded in a binary representation, and that the page should be processed accordingly. The server may indicate that that page is provided in a particular format via a special message, or the client may identify that the received page is not encoded in a text format. The client may also determine the format of the received binary representation using a compiler dictionary that indicates which instruction codes are associated with which page elements. The client may further request a particular version of the binary representation. For example, the client may request a compressed version of the web page if the client is bandwidth constrained, or an uncompressed representation if the client is not bandwidth constrained. The client may determine which compiler dictionary to use via a reconciliation process with the server. The client may create the DOM of the page using the binary representation without needing to parse text from a HTML document, thus reducing the amount of processing performed by the client before the page is rendered by the client.

At action 401, a determination is made as to whether the client is bandwidth constrained. For example, as described above (see FIG. 1), the client may be a mobile device that can access the network using both 3G and Wi-Fi. Where the client may only access the 3G network, the client may wish to limit the amount of bandwidth used due to slower available speeds and/or increased cost of using the network. Thus, the client may request smaller, compressed binary representations of the web content. Where the client is not bandwidth constrained (e.g., connecting via Wi-Fi), the client may request an uncompressed binary representation, to reduce the amount of processing necessary to render the page in a browser. Although a bandwidth constraint scenario is described to illustrate circumstances where different binary representations are appropriate, other factors may also influence the type of representation requested (e.g., available system resources, browser capabilities, battery level, type of page, etc.). For example, where device battery power is not constrained, the device may request a more complex representation (e.g., a compressed representation) because the device processor is not required to operate in a power saving mode. A combination of factors may also be used, such as by requesting a less complex (e.g., uncompressed) representation when both bandwidth is constrained and the device is operating on battery power.

At actions 402 and 403, the page is requested. The version of the page requested may be dependent upon whether or not the client was determined to be bandwidth constrained at action 401. Where the client is not bandwidth constrained, an uncompressed version of the page may be requested at action 402. Where the client is bandwidth constrained, a compressed version of the page may be requested at action 403. Although the two types of representations described relate to whether or not the page is compressed, other formats and versions of the binary representation may also be used as appropriate (e.g., different compiler dictionary versions, different data encoding formats, whether other generated and derived page elements are included, etc.). For example, the client 104 may send a HTTP GET request to the server 102 that is hosting the web page. The client 104 may explicitly request a binary representation of the web page, such as by issuing a special request command that indicates that the client is capable of processing a binary representation of the page. In some aspects, the client may be configurable by the user to determine whether to request a binary representation of a web page or a standard HTML document. The client 104 may include a flag in the initial request to the server 102 to indicate that the client 104 is capable of processing binary representations of web pages. The server 102 may respond to the client 102 with a flag in the response header. The client 102 may also identify valid HTML/compiled HTML by investigating the first few bytes of the file. The client 102 may also request that a specific version of the compiler dictionary be used (e.g., the client is older than the cutting edge). As such, the server 102 may be configured to support older versions. The server 102 may store multiple compiled versions of a given HTML file locally if different versions are requested.

At action 404, a binary representation of the web page is received. The binary representation may be generated from a source web page, such as described above (see FIGS. 1 and 3). The binary representation may be provided with a particular flag or identifier to indicate to the client that the web page is provided in a binary representation.

At action 406, the client may reconcile a version of the compiler dictionary used to generate the binary representation of the web page. The compiler dictionary may determine which binary instruction values correspond to particular page elements. The compiler dictionary may be reconciled between the client and server by identifying a particular version in the binary representation. Alternately, the client and server may perform a handshaking process to verify the version of the compiler dictionary. The server may transmit the compiler dictionary to the client. Transmission of the compiler dictionary may occur spontaneously (e.g., the server does not verify that the client does not have the correct version before transmission), or the transmission of the compiler dictionary may occur after verification that the client does not have the proper version. The client may determine the version from a version identifier embedded in the compiled page, and request an updated version of the compiler dictionary if the client does not have the proper version. The compiler dictionary may be provided such that newer versions of the dictionary are compatible with web pages encoded using older versions.

At action 408, the binary representation is used to load the web page. For example, the elements of the page defined by the binary instructions may be loaded into a DOM associated with the page. As described above, the binary representation may be processed by a browser plug-in loaded with the browser, or the browser may incorporate processing of the binary representation into the layout engine of the browser. Certain advantages may be obtained from integration with the layout engine, as the direct integration may allow for display of the page associated with the binary representation with fewer translation steps.

The process of loading the page may include creating the page structure as a DOM in the browser. During the loading operation, the browser may perform additional request operations to request content defined in the binary representation. For example, the browser may identify a tree structure in the binary representation that identifies elements of the page, and request those elements from the server. These requested elements may also be provided as binary representations. For example, as described above (see FIGS. 1 and 2), the elements of the page may be separated into binary representations of page structure, page content, and page style, and provided to the client in separate data elements.

At action 410, the page is rendered using the binary representation or representations received by the client. During the rendering process, the received binary representations are processed to determine how the page should be displayed in the web browser. Although the rendering process relates to preparing the web page for display, the page may not actually be displayed in the browser. For example, the web page may be loaded in a background browser instance, or the web page may be prerendered in a browser instance that is hidden from the user.

The stages of the illustrated methods described above are not intended to be limiting. The functionality of the methods may exist in a fewer or greater number of stages than what is shown and, even with the depicted methods, the particular order of events may be different from what is shown in the figures and include additional stages or omit stages as shown.

The systems and methods described above advantageously provide a straightforward method and system for providing web content in a fast, efficient manner. By converting HTML documents to a binary representation before transmission to a client, the associated pages may be displayed faster while simultaneously consuming less bandwidth. Although such representations may not be immediately readable by a human being, legacy support for providing page source may be maintained by allowing simultaneous or on-demand transmission of the original source page. The binary representation requires less processing by the browser, as the browser does not need to parse an entire text document into machine-readable instructions. The binary representation may also reproduce the DOM directly, such that the browser can immediately display the DOM while also maintaining functionality of components that rely upon manipulation of the DOM (e.g., JAVASCRIPT).

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A computer-implemented method for providing a binary representation of a web page, the method comprising:
   parsing a web page source document, using a processor, to identify one or more page elements, the source document comprising text that defines a web page, where the source document is written in hypertext markup language ("HTML");
   generating, with the processor, a binary representation corresponding to a document object model structure of a web page using the identified one or more page elements, the binary representation including a conversion of a type of each page element, syntax information of each page element, and the one or more page elements to a format other than plain text, wherein the binary representation is generated using a binary representation dictionary, the binary representation dictionary defining at least one binary instruction corresponding to each of the one or more page elements; and
   providing the binary representation such that, in response to a request from a client device, the binary representation is provided to the client device to render the web page without parsing the web page source document.

2. The method of claim 1, wherein the binary representation includes a datum identifying a version of the binary representation dictionary.

3. The method of claim 1, wherein the binary representation is provided incrementally.

4. A computer-implemented method, the method comprising:
   parsing a web page source document, using a processor, to identify one or more page elements, the source document comprising text that defines a web page, where the source document is written in hypertext markup language ("HTML");
   generating, with the processor, a binary representation corresponding to a document object model structure of a web page using the identified one or more page elements, the binary representation including a conversion of a type of each page element, syntax information of each page element, and the one or more page elements to a format other than plain text, wherein the binary representation includes a tree structure, and each of the one or more page elements is a node in the tree structure; and
   providing the binary representation such that, in response to a request from a client device, the binary representation is provided to the client device to render the web page without parsing the web page source document.

5. A computer-implemented method, the method comprising:
   parsing a web page source document, using a processor, to identify one or more page elements, the source document comprising text that defines a web page, where the source document is written in hypertext markup language ("HTML");
   generating, with the processor, a binary representation corresponding to a document object model structure of a web page using the identified one or more page elements, the binary representation including a conversion of a type of each page element, syntax information of each page element, and the one or more page elements to a format other than plain text, wherein the binary representation is associated with a version identifier, and the method further comprises:
   determining if the web page source document has changed since the binary representation was generated using the version identifier, and
   generating a new binary representation using the web page source document if the web page source document has changed since the binary representation was generated; and
   providing the binary representation such that, in response to a request from a client device, the binary representation is provided to the client device to render the web page without parsing the web page source document.

6. The method of claim 5, wherein the version identifier is at least one of a time stamp or a hash value.

7. A computer-implemented method for processing a web page received in a binary representation, the method comprising:
   receiving a web page in a binary representation, the binary representation defining a type of each page element, syntax information of each page element, and a document object model of the web page, the document object model defining one or more hypertext markup language ("HTML") page elements as including at least a pair of an integer value and one or more attributes associated with the integer value;
   rendering the web page, using a processor, by processing the binary representation, the structure of the web page defined by the document object model; and
   reconciling a first binary representation dictionary version used in rendering the web page with a second binary representation dictionary version used in compiling the web page.

8. The method of claim 7, further comprising rendering the web page only when the first binary representation dictionary version is greater than or equal to the second binary representation dictionary version.

9. The method of claim 7, further comprising requesting an updated binary representation dictionary when the first binary representation dictionary version is not greater than or equal to the second binary representation dictionary version.

10. A computer-implemented method, the method comprising:
    receiving a web page in a binary representation, the binary representation defining a document object model of the web page, the document object model defining one or more hypertext markup language ("HTML") page elements as including at least a pair of an integer value and one or more attributes associated with the integer value, wherein the binary representation comprises a tree structure defining the document object model and the one or more page elements, the binary representation is received incrementally, and the method further comprises requesting data corresponding to the one or more page elements as each page element is rendered; and
    rendering the web page, using a processor, by processing the binary representation, the structure of the web page defined by the document object model.

11. A processing system for providing a binary representation of a web page, the processing system comprising:
    a memory for storing a web page source document and a binary representation of the web page source document; and
    at least one processor coupled to the memory, the at least one processor configured to:
    parse the web page source document to identify one or more page elements, the web page source document comprising text that defines a web page, where the source document is written in hypertext markup language ("HTML");

generate a binary representation corresponding to a document object model of a web page using the identified one or more page elements, the binary representation including a conversion of a type of each page element, syntax information of each page element, and the one or more page elements to a format other than plain text, wherein the binary representation is generated using a binary representation dictionary, the binary representation dictionary defining at least one binary instruction corresponding to each of the one or more page elements; and provide the binary representation such that, in response to a request from a client device, the binary representation may be provided to the client device to render the web page without parsing the web page source document.

12. The processing system of claim 11, wherein the binary representation includes a datum identifying a version of the binary representation dictionary.

13. The processing system of claim 12, wherein the binary representation further comprises cascading style sheet information associated with the web page.

14. A processing system for providing a binary representation of a web page, the processing system comprising:

a memory for storing a web page source document and a binary representation of the web page source document; and at least one processor coupled to the memory, the at least one processor configured to:

parse the web page source document to identify one or more page elements, the web page source document comprising text that defines a web page, where the source document is written in hypertext markup language ("HTML");

generate a binary representation corresponding to a document object model of a web page using the identified one or more page elements, the binary representation including a conversion of a type of each page element, syntax information of each page element, and the one or more page elements to a format other than plain text, wherein the binary representation is associated with a version identifier, and the method further comprises:

determining if the web page source document has changed since the binary representation was generated using the version identifier, and generating a new binary representation using the web page source document if the web page source document has changed since the binary representation was generated; and providing the new binary representation such that, in response to a request from a client device, the new binary representation may be provided to the client device to render the web page without parsing the web page source document.

15. The method of claim 14, wherein the version identifier is at least one of a time stamp or a hash value.

* * * * *